W. B. H. DOWSE.
SNAP FASTENER.
APPLICATION FILED FEB. 5, 1908.
904,517. Patented Nov. 24, 1908.
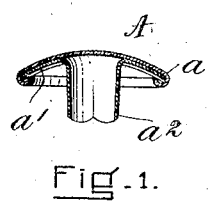
Fig. 1.
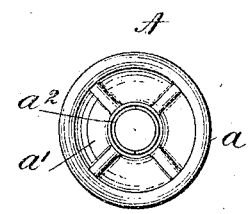
Fig. 2.
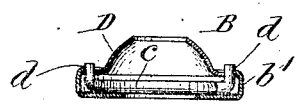
Fig. 6.
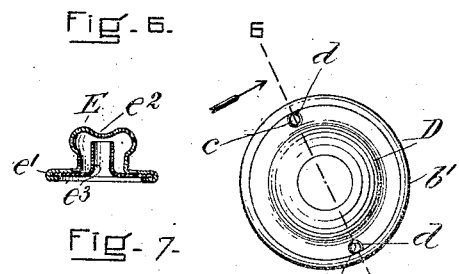
Fig. 7. Fig. 5.
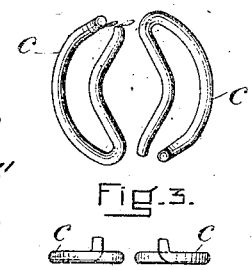
Fig. 3.
Fig. 4.
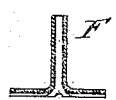
Fig. 8.
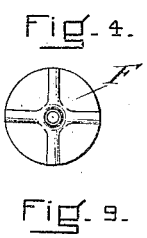
Fig. 9.
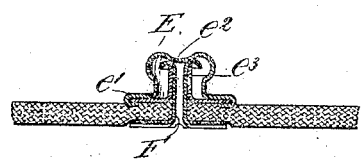
Fig. 10.
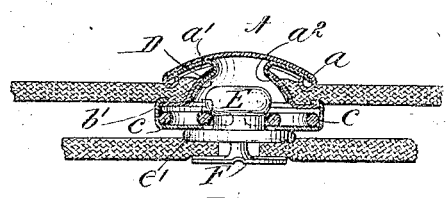
Fig. 11.
WITNESSES:
Charles S. Woodbury
Josephine H. Ryan
INVENTOR:
William B. H. Dowse
by Odin Roberts
Attorney

UNITED STATES PATENT OFFICE.

WILLIAM B. H. DOWSE, OF NEWTON, MASSACHUSETTS, ASSIGNOR TO UNITED STATES FASTENER COMPANY, OF BOSTON, MASSACHUSETTS, A CORPORATION OF MAINE.

SNAP-FASTENER.

No. 904,517.  Specification of Letters Patent.  Patented Nov. 24, 1908.

Application filed February 5, 1908. Serial No. 414,293.

*To all whom it may concern:*

Be it known that I, WILLIAM B. H. DOWSE, a citizen of the United States, and resident of Newton, in the county of Middlesex and State of Massachusetts, have invented new and useful Improvements in Snap-Fasteners, of which the following is a specification.

My invention relates to snap fasteners and consists of certain structural improvements in the construction of the socket member.

Its object is to provide a snap fastener the parts of which are simple and readily assembled and which is strong, durable and not injuriously affected by rough usage.

Referring to the drawings Figure 1 is a sectional view of a portion of my improved socket member, Fig. 2 is a plan view of the parts shown in Fig. 1, Figs. 3 and 4 are respectively a plan view and sectional view of a stud retaining device used in said socket; Fig. 5 is a plan view of a dome used in said socket member; Fig. 6 is a sectional view of a portion of said socket member showing in operative position the parts shown in Figs. 3, 4 and 5; Fig. 7 is a sectional view of a portion of a stud member; Fig. 8 is a sectional view of an attaching eyelet; Fig. 9 is a plan view of said eyelet; Fig. 10 shows in section a stud attached to material; and Fig. 11 shows in section my improved snap fastener attached to material.

A is the upper section or cap piece of my improved socket member and comprises a cap or shell $a$ secured to a disk $a'$ by clenching its edge over the latter. The disk $a'$ is provided with an eyelet $a^2$ made integrally therewith and also with radial ribs or spokes best shown in Fig. 2. These ribs perform the double function of preventing the two cap pieces $a$, $a'$, from turning relatively to each other and also prevent these pieces from turning upon the material. This is of importance, for it is usual to place the name or initials of manufacturers, or other ornamentation, upon the caps of fasteners of this class and it is very desirable that the design upon the cap shall remain permanently in the position in which it is placed.

B is the lower section of my improved socket member, comprising a casing $b'$ having a central stud receiving opening. Within said casing is a retaining device adapted to hold the stud in its socket. This retaining device comprises two springs $c$, $c$, made of bent wire or other suitable material each member having an inner and outer curved portion and each turned upward at one end. The closed ends of these springs are faced in opposite directions and consequently the pinch of the springs on the stud is equalized at both ends of the springs and the tension necessary to pull the stud from the socket is the same in any two diametrically opposed directions.

A dome D is provided having a central opening and holes $d$, $d$, on opposite sides of its center adapted to receive the upturned ends of said springs $c$, $c$, and prevent their turning.

In assembling the parts of section B of my improved socket member, the springs $c$, $c$, are first placed in the casing $b'$ with their closed ends facing in opposite directions and with their outer curved portions resting against the annular wall of the casing $b'$ and their inner curved portions projecting within the stud receiving opening in said casing $b'$. The dome D is then placed within the casing $b'$, the upturned ends of the springs $c$, $c$, being inserted in the holes $d$, $d$. The dome D is held in place by the flange of the casing $b'$ which is clenched thereon. In assembling the parts A and B of my improved socket member, the eyelet $a^2$ is inserted through the material and then through the perforation in the dome D. When pressure is applied by suitable instruments, the eyelet $a^2$ is spread and the parts assume the relations shown in Fig. 11.

What I claim is:

In a snap fastener, a socket member comprising a casing having a central stud receiving opening and an annular wall, a stud retaining device within said casing comprising two spring members each upturned at one end and each having an inner and an outer curved portion, the inner curved portion of said springs projecting within said stud receiving opening and the closed ends of said springs facing in opposite directions, a dome within said casing having a central aperture and holes on opposite sides of its center adapted to receive the upturned ends of said springs to prevent said springs from turning.

Signed by me at Boston, Massachusetts, this thirtieth day of January, 1908.

WILLIAM B. H. DOWSE.

Witnesses:
  A. H. HOUGHTON,
  G. A. HOLMES.